United States Patent
Raju

(10) Patent No.: US 12,265,919 B2
(45) Date of Patent: Apr. 1, 2025

(54) METHOD, NON-TRANSITORY MACHINE-READABLE MEDIUM, AND SYSTEM FOR IDENTIFYING COMPARABLE ENTITIES USING MACHINE LEARNING AND PROFILE GRAPHS

(71) Applicant: Clari Inc., Sunnyvale, CA (US)

(72) Inventor: Balasubramaniam Raju, Palo Alto, CA (US)

(73) Assignee: CLARI INC., Sunnyvale, CA (US)

(*) Notice: Subject to any disclaimer, the term of this patent is extended or adjusted under 35 U.S.C. 154(b) by 830 days.

(21) Appl. No.: 16/693,136

(22) Filed: Nov. 22, 2019

(65) Prior Publication Data

US 2021/0158181 A1     May 27, 2021

(51) Int. Cl.
    *G06N 5/04*    (2023.01)
    *G06N 20/00*    (2019.01)

(52) U.S. Cl.
    CPC ............... *G06N 5/04* (2013.01); *G06N 20/00* (2019.01)

(58) Field of Classification Search
    USPC ............................................... 705/26.1–27.2
    See application file for complete search history.

(56) References Cited

U.S. PATENT DOCUMENTS 10,572,935 B1 * 2/2020 Murray .................. G06Q 40/00
10,990,988 B1 * 4/2021 Goyette ............. G06Q 30/0202
2013/0073346 A1 * 3/2013 Chun .................... H04L 67/104
    705/7.39
2013/0332438 A1 * 12/2013 Li ..................... G06F 16/24575
    707/706
2019/0122140 A1 * 4/2019 Sen ........................ G06N 3/006
2021/0312541 A1 * 10/2021 Worthington ........ G06N 3/0472

OTHER PUBLICATIONS

Fittinghoff, A. Combining technographic and firmographic data is key in successfully selecting target accounts. Cape Town: SyndiGate Media Inc. Retrieved from https://dialog.proquest.com/professional/docview/2331878881?accountid=131444 (Year: 2019).*

* cited by examiner

*Primary Examiner* — Jeffrey A. Smith
*Assistant Examiner* — Ashley D Preston
(74) *Attorney, Agent, or Firm* — WOMBLE BOND DICKINSON (US) LLP

(57) ABSTRACT

Techniques for identifying similar companies based on profile data sets of the companies are provided. In one embodiment, a method comprises using a processing device to obtain a benchmark profile data set for a benchmark company and obtain a plurality of profile data sets, each of the plurality of profile data sets corresponding to a candidate company. The processing device may utilize a machine learning algorithm to determine the distance between each of the plurality of profile data sets and the benchmark profile data set and build profile graphs indicating the distance. The processing device may determine one or more of the plurality of profile data sets that are most similar to the benchmark profile data set based on the determined distance and identify the one or more candidate companies corresponding to the one or more profile data sets as companies most similar to the benchmark company.

20 Claims, 8 Drawing Sheets

METHOD, NON-TRANSITORY MACHINE-READABLE MEDIUM, AND SYSTEM FOR IDENTIFYING COMPARABLE ENTITIES USING MACHINE LEARNING AND PROFILE GRAPHS

TECHNICAL FIELD

Aspects of the present disclosure relate to data analysis, and more particularly, to identifying similarities between sets of information corresponding to different entities.

BACKGROUND

Many data analysis tasks involve identifying data points that are similar to each other from among a larger number of data points. Such analysis has applications in many different areas, such as product recommendations on a retail website, article recommendations on a news website, and content recommendations on a video streaming service, for example. Supervised machine learning algorithms rely on labeled input data to learn a function that produces an appropriate output when given new unlabeled data. Many supervised learning algorithms assume that similar data points exist in close proximity to each other and are often used to solve classification or regression problems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Techniques for finding similarities between sets of data have applications across many different technologies. Some example applications include digital content recommendation engines (e.g., for movie or music recommendations), data compression, and genetics. In one example, organizations that do business with a company often times wish to find similar companies with which to do business, as similar companies may have similar needs that they can address, thereby expanding their sales pipeline. However, identifying companies that are similar to a current client may involve large amounts of manual research, which include significant costs and personnel hours. In addition, by performing such research manually, large amounts of relevant data may be missed, resulting in inaccurate or incomplete lists of similar companies.

The present disclosure addresses the above-noted and other deficiencies by using a processing device to obtain a benchmark profile data set for a benchmark company and obtain a plurality of profile data sets, each of the plurality of profile data sets corresponding to a candidate company. Each of the plurality of profile data sets and the benchmark profile data set comprises firmographic, technographic, and public information. The processing device may utilize a machine learning algorithm to determine the distance between each of the plurality of profile data sets and the benchmark profile data set and build profile graphs indicating the distance. The processing device may determine one or more of the plurality of profile data sets that are most similar to the benchmark profile data set based on the determined distances; and identify the one or more candidate companies corresponding to the one or more profile data sets as companies most similar to the benchmark company. Although discussed with respect to determining similar companies, embodiments of the present disclosure may be used to determine similarities between data sets in various different applications (e.g., those mentioned above).

Figure 1:
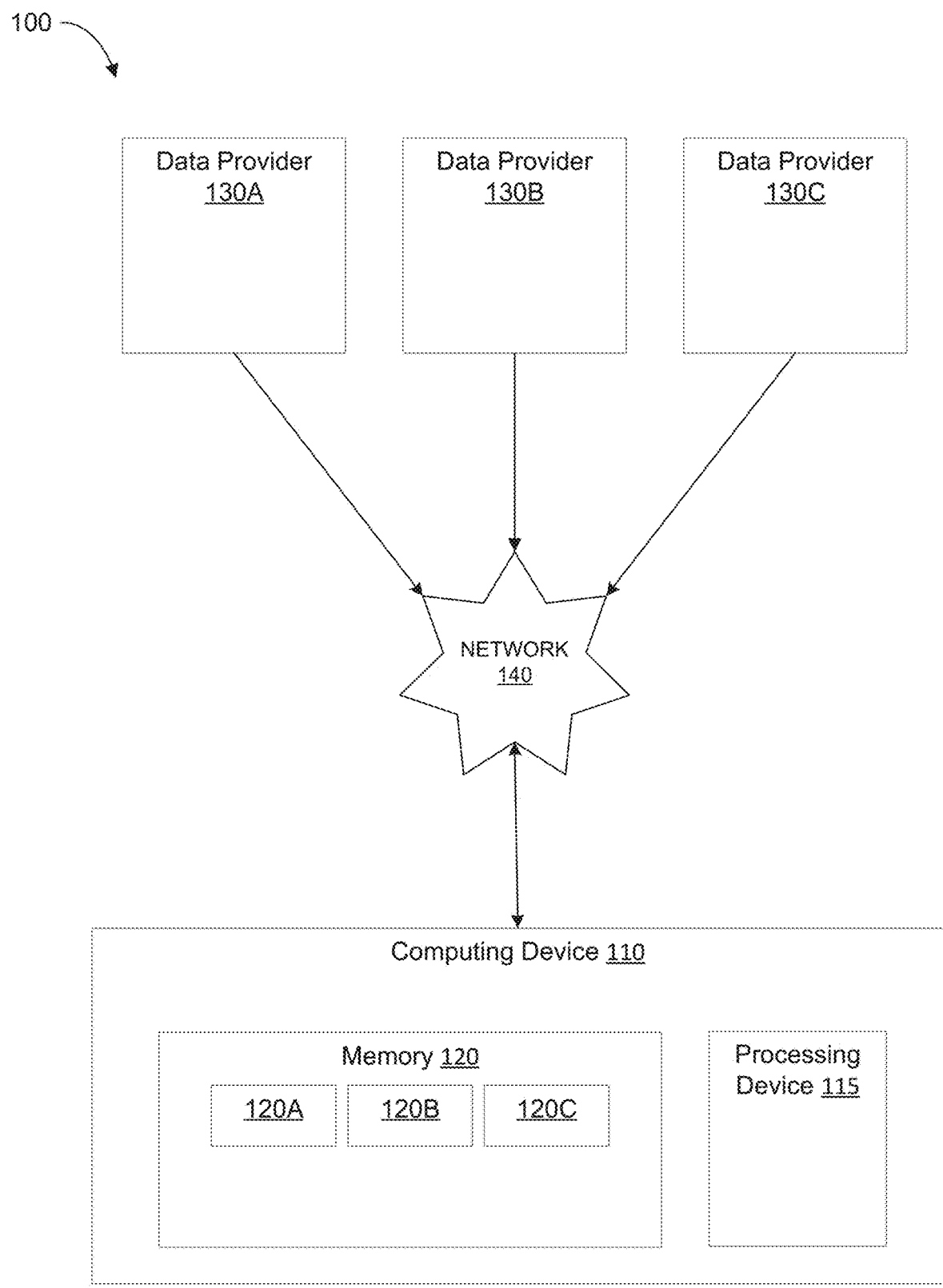
FIG. 1 is a block diagram that illustrates an example system, in accordance with some embodiments of the present disclosure.

FIG. 1 is a block diagram that illustrates an example system 100. As illustrated in FIG. 1, the system 100 includes computing device 110, data providers 130A-130C, and a network 140. The computing device 110 and the data providers 130, may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the data providers 130.

Each of computing device 110 and data providers 130 may also include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). In the example of FIG. 1, only processing device 115 and memory 120 of computing device 110 have been shown for ease of illustration. The memory of a computing device 110 or data provider 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices Each of computing device 110 and data providers 130 may comprise any suitable type of computing device or machine that has a programmable processor including, for example, server computers, desktop computers, laptop computers, tablet computers, smartphones, set-top boxes, etc. In some examples, the computing device 110 and the data providers 130 may each comprise a single machine or may include multiple interconnected machines (e.g., multiple servers configured in a cluster). The computing device 110 and the data providers 130 may be implemented by a common entity/organization or may be implemented by different entities/organizations.

For example, computing device 110 may be operated by a first company/corporation and one or more data providers 130 may be operated by a second company/corporation. Each computing device 110 and the data providers 130 may execute or include an operating system (OS), as discussed in more detail below. The OS of a computing device 110 or a data provider 130 may manage the execution of other components (e.g., software, applications, etc.) and/or may manage access to the hardware (e.g., processors, memory, storage devices etc.) of the computing device. In some embodiments, computing device 110 and the data providers 130 may be in a client/server relationship, with computing device 110 acting as a client and data providers 130 acting as a server.

Each data provider 130 may function to provide or make available, data regarding one or more entities such as companies. Such data may include technographic, firmographic, and public information about one or more entities. Each data provider 130 may be a news outlet, company website, third party data providing service, data aggregator, or government website, for example. Technographic information may refer to specific hardware and software technologies that a company may use to conduct its business. Technographic information may also include information about how and when a company use their technology. Examples of technographic information may include the computer and network hardware, software applications, network virtualization platforms, network security and firewall software, customer relationship management (CRM) software, and video conferencing software used by a company, for example.

Firmographic Data may refer to characteristics of companies that may be utilized to group them together to form market segments. Such characteristics may include company size, vertical, and location, for example. Public information may refer to information about a company's activities that is in the public domain such as quarterly results, personnel announcements, product development and marketing announcements, news of a partnership or joint venture, and funding/investment announcements, for example. Each different aspect of information (e.g., quarterly results, personnel announcements, network security and firewall software used by a company, vertical, and location) may be referred to as a dimension of information.

In some embodiments, computing device 110 may obtain technographic, firmographic, and public information from data providers 130 directly and/or by scanning the data providers 130 (e.g., scanning numerous web domains or mobile applications associated with data providers 130) periodically. Computing device 110 may utilize any appropriate data collection tactics (or combination thereof) to perform this scanning including web crawling, and natural language processing, for example. Because most technologies leave behind a footprint or "signature" that helps a web crawler identify it from other elements of a website or mobile app, computing device 110 may find and catalog these signatures across large numbers of web sites, and learn which companies are using a given technology. In addition, by utilizing web crawlers to monitor each site periodically, computing device 110 may observe when certain technologies appear or disappear. For technologies that leave no footprint (e.g., databases, CRMs and other technologies), computing device 110 may utilize natural language processing, which involves scanning and digesting unstructured data from numerous sources. For example, computing device 110 may scan and analyze text from job postings, social media, press releases and more to infer a relationship between a company and particular technology. In some embodiments, computing device 110 may also utilize customer surveys and crowdsourcing technologies to obtain this information. Computing device 110 may obtain firmographic and public information in similar ways. The technographic, firmographic, and public information of a company may be referred to as the company's profile data set.

As illustrated in FIG. 1, memory 120 includes a company or entity analysis software (SW) module 120A (hereinafter "module 120A"). In some embodiments, upon executing a transaction with a benchmark company or entity, processing device 120 may execute module 120A to perform one or more of the functions described herein. Computing device 110 may obtain a benchmark profile dataset for the benchmark company or entity (e.g., using the techniques described herein) and store it in memory 120. Note that a company is utilized as an example of an entity throughout this application. However, other types of entities may also be applicable. For example, an entity may be an organization, a business unit or department of an organization. An entity may also be a user group.

Computing device 110 may also obtain profile data sets for each of a plurality of candidate companies and store the plurality of profile data sets in memory 120. Candidate companies may refer to companies with whom business opportunities similar to those conducted with the benchmark company may exist. More specifically, computing device 110 may obtain the technographic, firmographic, and public information of the benchmark company as well as the plurality of candidate companies as discussed above. Upon obtaining such information, computing device 110 may prepare it for analysis by a machine learning (ML) algorithm by properly structuring the information. For example, the information may not be in the format that the algorithm expects, or there may be missing values that should be filled or removed from the data before analysis by the algorithm.

For example, computing device 110 may scrape information regarding the market segment of each of the plurality of companies, and may convert the market segment into a numerical value that can be used in the ML analysis. Upon properly structuring the information, computing device 110 may populate a company information database 120B with the technographic, firmographic, and public information of each of the plurality of candidate companies, such that company information database 120B includes a data entry for each of the plurality of candidate companies. The data entry for each of the plurality of candidate companies may include the technographic, firmographic, and other public information of that candidate company (hereinafter referred to as the profile data set for that company). Computing device 110 may also populate a benchmark company information database 120C with the technographic, firmographic, and public information of the benchmark company (hereinafter referred to as the benchmark profile data set).

Computing device 110 may then utilize an appropriate ML algorithm to compare the profile dataset for each of the plurality of candidate companies to the benchmark dataset 120C in order to find candidate companies that are the most closely related to the benchmark company. The machine learning algorithm may be any appropriate ML algorithm such as the K-nearest neighbor algorithm, neighborhood component analysis algorithm, or the large margin nearest neighbors algorithm, for example. More specifically, for each of the plurality of candidate companies, computing device 110 may utilize the ML algorithm to determine a distance between the profile data set for that company and the benchmark profile data set.

Computing device 110 may determine this distance for each dimension (e.g., CRM software used, company size, vertical, etc.) of the profile data set and benchmark profile data sets as well as an overall distance computation. The distance may be calculated as the Euclidean distance, cosine similarity, or any other suitable distance measurement between corresponding values of the profile data set for that company and the benchmark profile data set for each dimension as well as overall distance. For example, computing device 110 may determine the Euclidean distance between the employee count, revenue, market segment, and other dimensions of the profile data set for that candidate company and the benchmark profile data set.

Figure 2A:
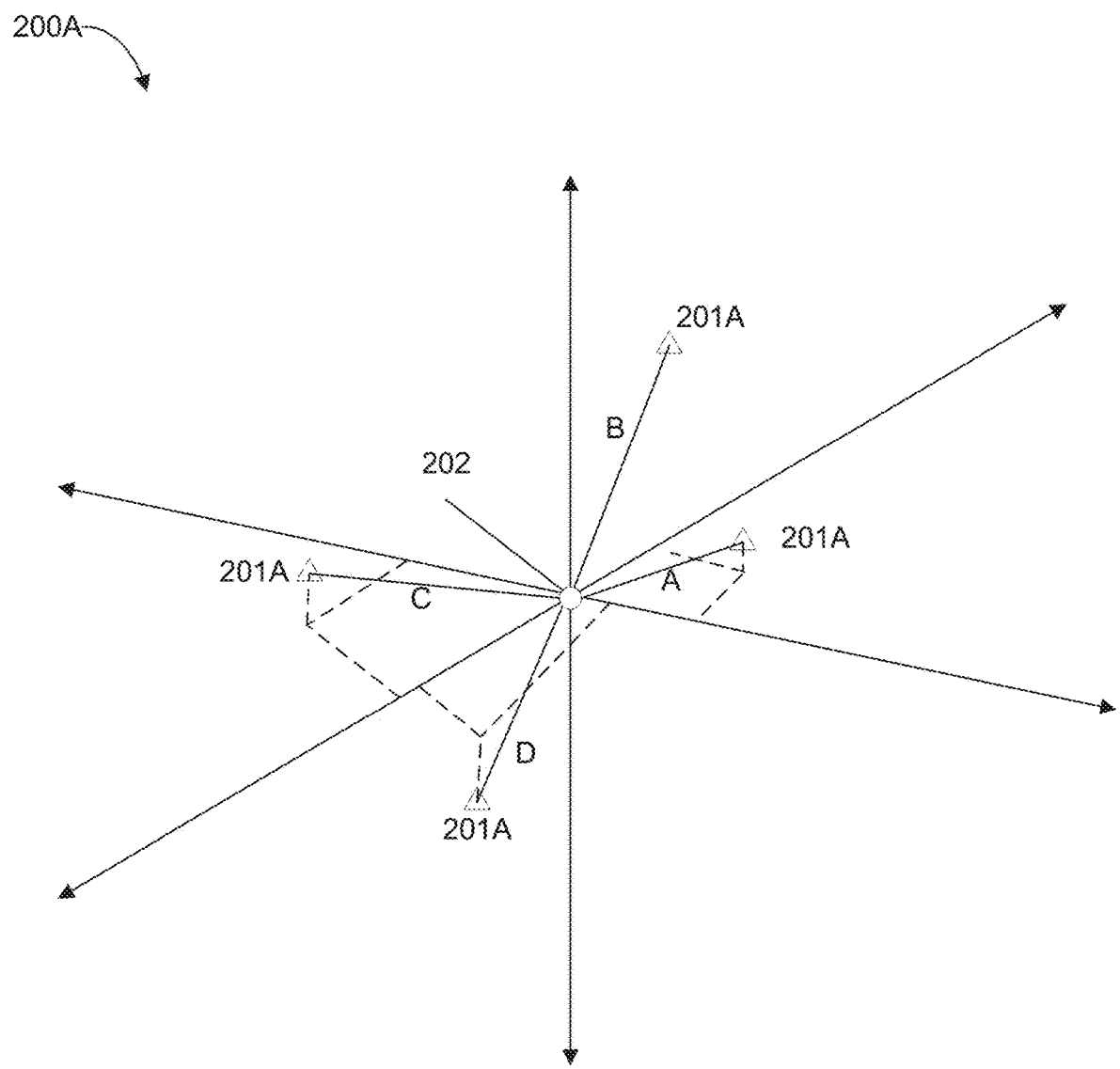
FIG. 2A is a graph that illustrates the distance between two profile data sets for various dimensions of information, in accordance with some embodiments of the present disclosure.
Figure 2B:
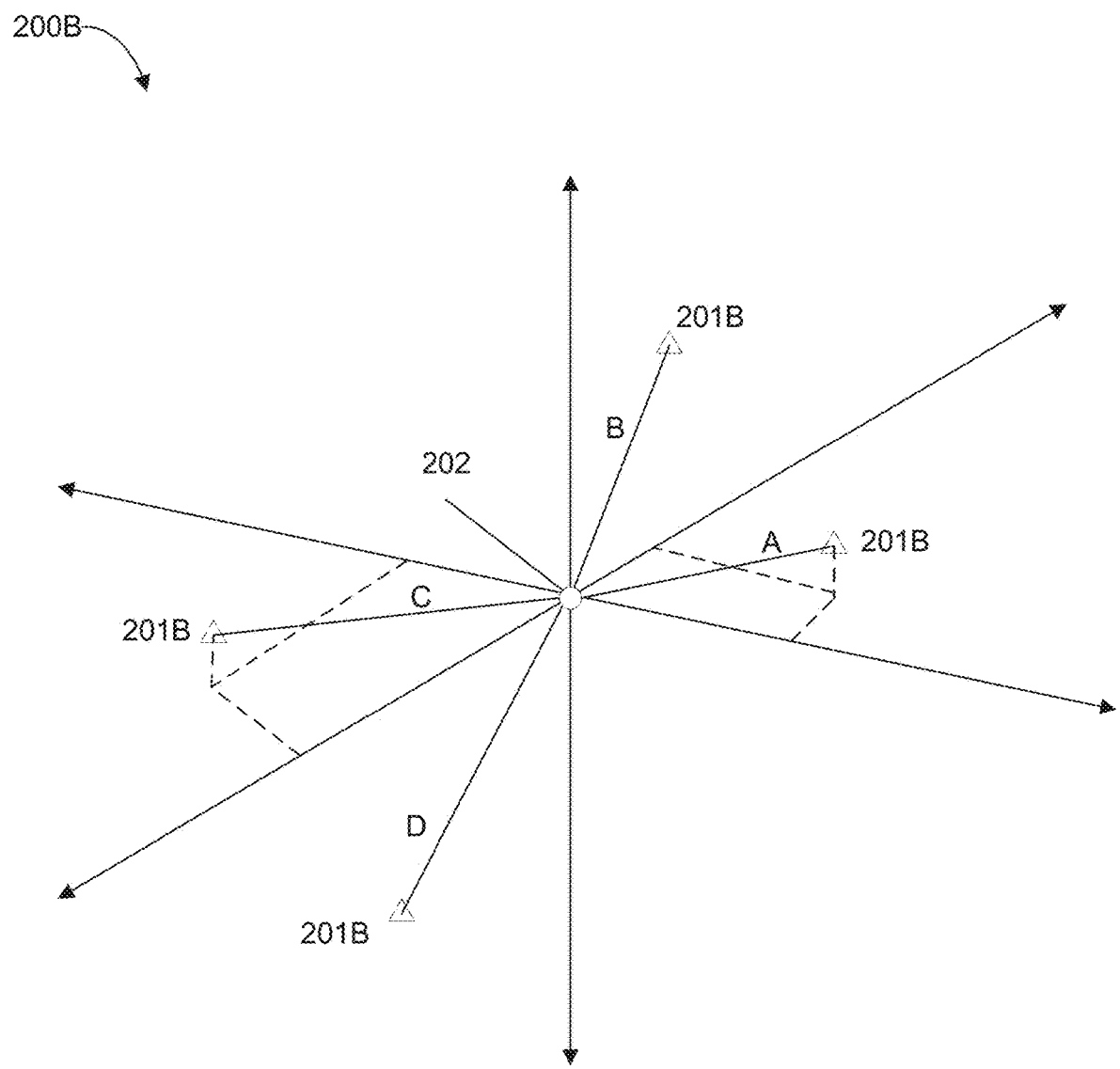
FIG. 2B is a graph that illustrates the distance between two profile data sets for various dimensions of information, in accordance with some embodiments of the present disclosure.
Figure 2C:
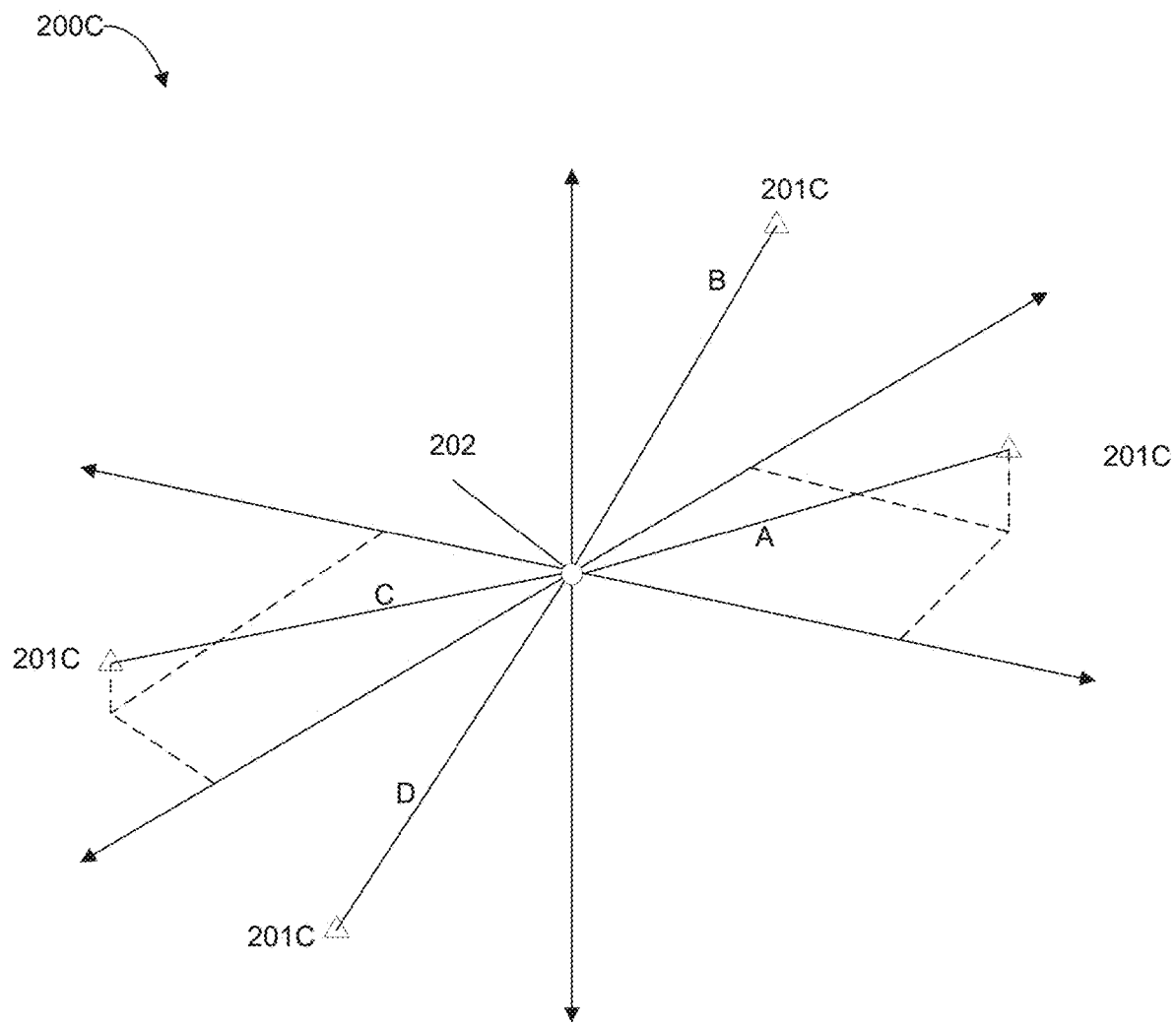
FIG. 2C is a graph that illustrates the distance between two profile data sets for various dimensions of information, in accordance with some embodiments of the present disclosure.

Based on the ML analysis, for each of the plurality of profile data sets, computing device 110 may create a profile graph showing the proximity of that profile data set to the benchmark profile data set in various dimensions. A profile graph can be implemented in any form of graphical representations with any kinds of graphics attributes such as, colors and shapes etc. FIGS. 2A-2C illustrate profile graphs 200A-200C respectively. Each of the profile graphs 200 illustrate the proximity of a profile data set 201 to the benchmark profile data set 202 in 4 dimensions A-D. Each dimension may represent a particular aspect of the candidate company and benchmark profile data sets. In the example of FIGS. 2A-2C, dimension A may correspond to employee count, dimension B may correspond to revenue, dimension C may correspond to market segment, and dimension D may correspond to CRM software used. The graphics attributes such as a length, thickness, color, and/or shape of a dimension may be utilized to represent certain characteristics of data, such as number of employees, an amount of revenue, etc. FIGS. 2A-2C illustrate four dimensions of Euclidean distance for ease of illustration, but as discussed herein, the profile graph for each of the plurality of profile data sets may include a Euclidean distance between corresponding values of the profile data set and benchmark profile data set for each dimension of information.

As shown in FIG. 2A, the Euclidean distance between the benchmark profile data set 202 and profile data set 201A may be 2 with respect to employee count, 5 with respect to revenue, 4 with respect to market segment, and 4 with respect to CRM software used. As shown in FIG. 2B, the Euclidean distance between the benchmark profile data set 202 and profile data set 201B may be 4 with respect to employee count, 6 with respect to revenue, 7 with respect to market segment, and 8 with respect to CRM software used.

As shown in FIG. 2C, the Euclidean distance between the benchmark profile data set and profile data set 201C may be 7 with respect to employee count, 8 with respect to revenue, 8 with respect to market segment, and 8 with respect to CRM software used.

Figure 3:
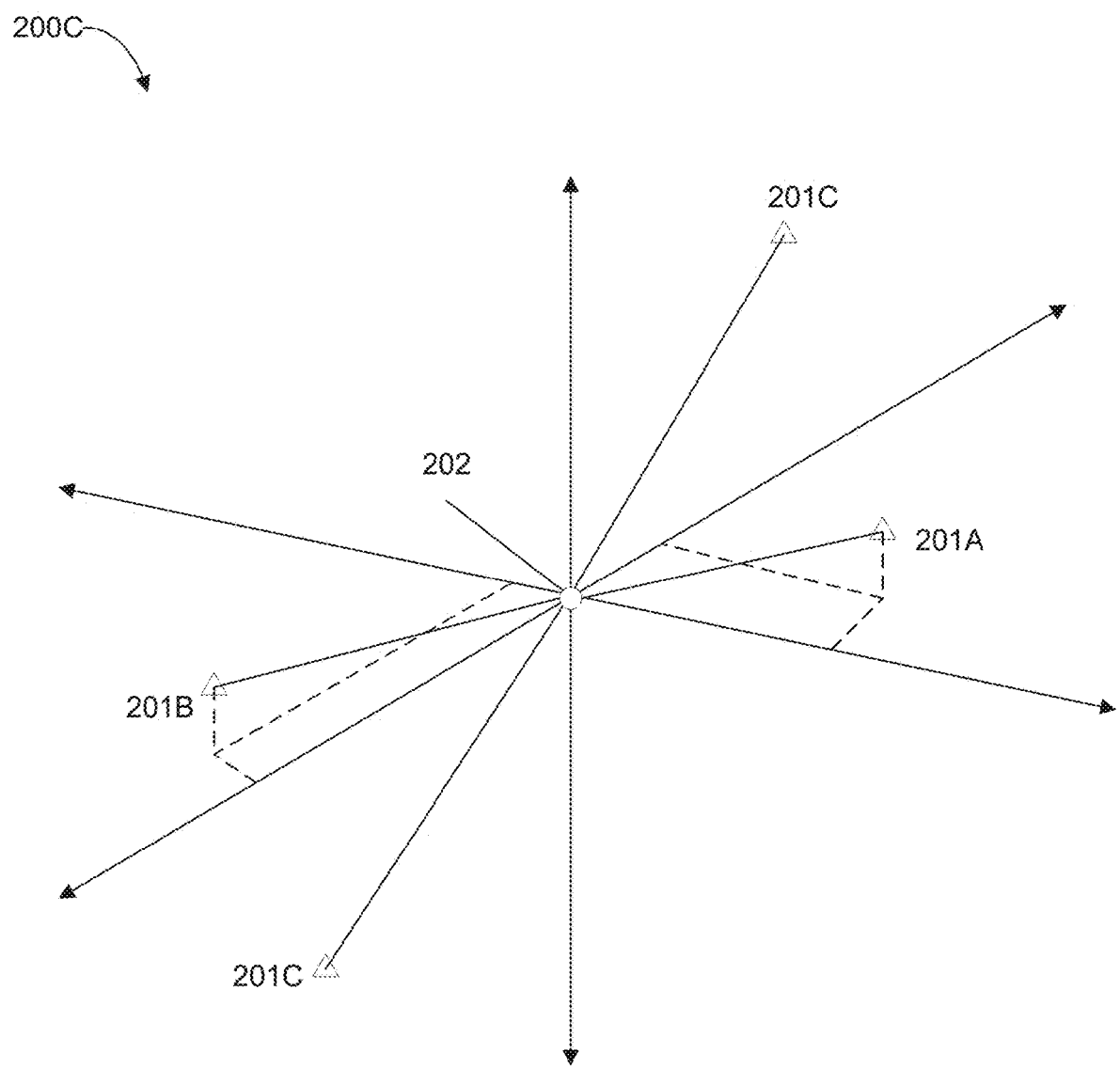
FIG. 3 is a graph that illustrates an overall distance between two profile data sets, in accordance with some embodiments of the present disclosure.

Upon generating the profile graph for each of the plurality of profile data sets (i.e. candidate companies), computing device 110 (executing module 120) may determine the overall distance between each profile data set 201 and the benchmark profile data set 202 based on the average distance between that profile data set and the benchmark profile data set for each dimension A-D. FIG. 3 illustrates a profile graph 300 showing the overall proximity of each profile data set 201 to the benchmark profile data set or node 202. As shown in FIG. 3, profile data set or node 201A may have an overall distance of 3.75 from the benchmark profile data set 202, profile data set 201B may have an overall distance of 6.25 from the benchmark profile data set 202, and profile data set 201C may have an overall distance of 7.75 from the benchmark profile data set 202. Computing device 110 may order each candidate company by the overall distance between its profile data set the benchmark profile data set 202 and may present this information to a user. In some embodiments, computing device 110 may identify the candidate companies corresponding to the one or more profile data sets that have the smallest overall distance to the benchmark profile data set as companies most similar to the benchmark company, and thus candidate companies most likely to represent a similar business opportunity as the benchmark company.

In some embodiments, a user may modify, via a graphical user interface of a server hosting the servers of generating profile graphs, the ML algorithm used to emphasize or give additional weight to certain dimensions of information. For example, module 120A may provide a user interface which allows the user to weigh certain dimensions such as network security software used, company size, and location for example more heavily than other dimensions. In addition, module 120A may learn which dimensions are more important after a certain number of attempts, and may thus learn which factors should be weighted more.

Figure 4A:
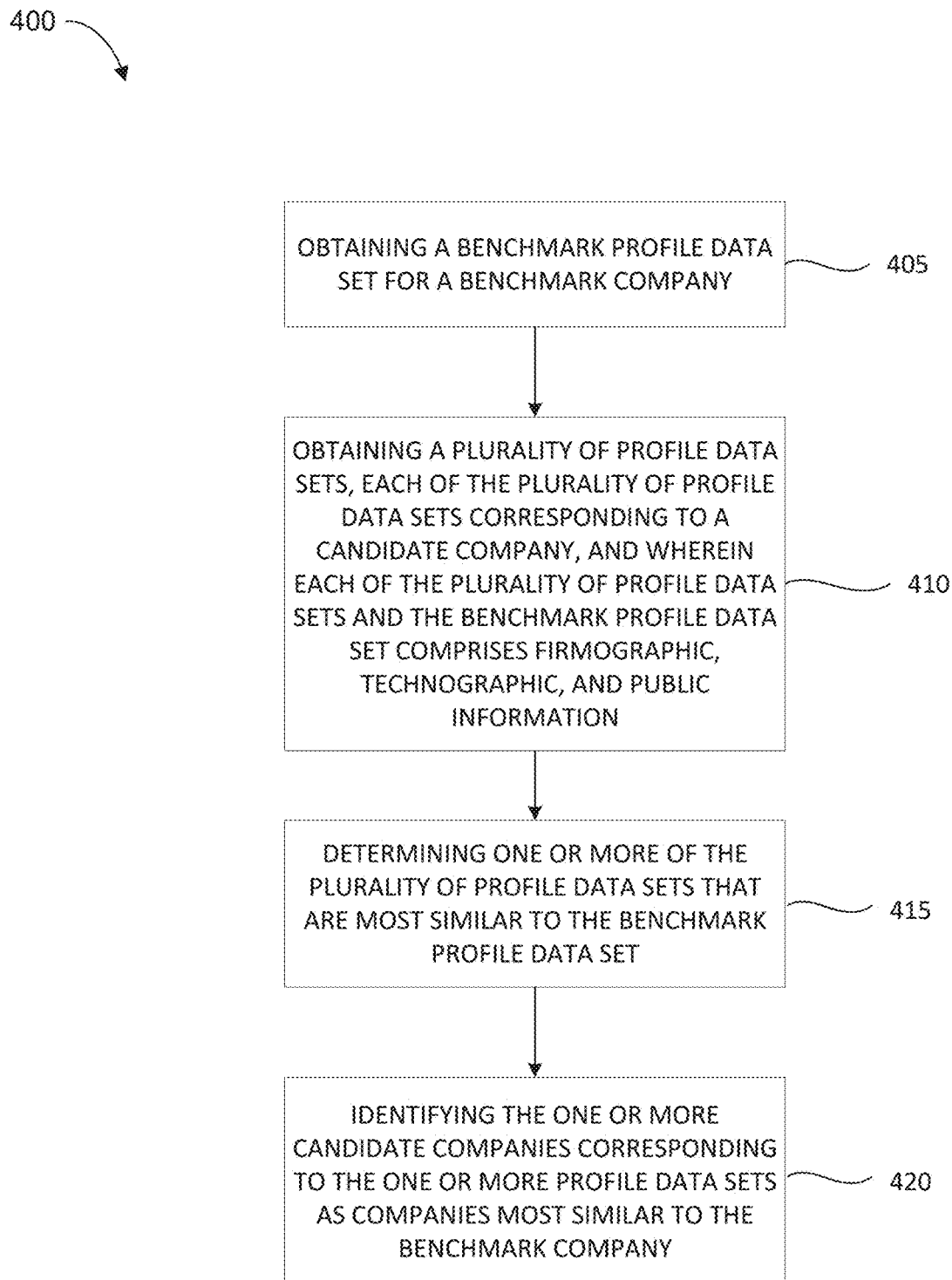
FIG. 4A is a flow diagram illustrating a method for identifying similar profile data sets, in accordance with some embodiments of the present disclosure.

FIG. 4A is a flow diagram illustrating a method 400 for building and comparing profile graphs of companies in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIG. 1).

The method 400 begins at block 405 where computing device 110 may obtain a benchmark profile dataset for the benchmark company and store it in memory 120. At block 410, computing device 110 may also obtain profile data sets for each of a plurality of candidate companies and store the plurality of profile data sets in memory 120. A company's profile data set may comprise the technographic, firmographic, and public information of that company. In some embodiments, computing device 110 may obtain technographic, firmographic, and public information from data providers 130 directly and/or by scanning the data providers 130 (e.g., scanning numerous web domains or mobile applications associated with data providers 130) periodically. Computing device 110 may utilize any appropriate data collection tactics (or combination thereof) to perform this scanning including web crawling, and natural language processing, for example. Because most technologies leave behind a footprint or "signature" that helps a web crawler identify it from other elements of a website or mobile app, computing device 110 may find and catalog these signatures across large numbers of web sites, and learn which companies are using a given technology. In addition, by utilizing web crawlers to monitor each site periodically, computing device 110 may observe when certain technologies appear or disappear. For technologies that leave no footprint (e.g., databases, CRMs and other technologies), computing device 110 may utilize natural language processing, which involves scanning and digesting unstructured data from numerous sources. For example, computing device 110 may scan and analyze text from job postings, social media, press releases and more to infer a relationship between a company and particular technology. In some embodiments, computing device 110 may also utilize customer surveys and crowd-sourcing technologies to obtain this information. Computing device 110 may obtain firmographic and public information in similar ways. The technographic, firmographic, and public information of a company may be referred to as the company's profile data set.

At block 415, the computing device 110 may determine one or more of the plurality of profile data sets that are most similar to the benchmark profile data set.

Figure 4B:
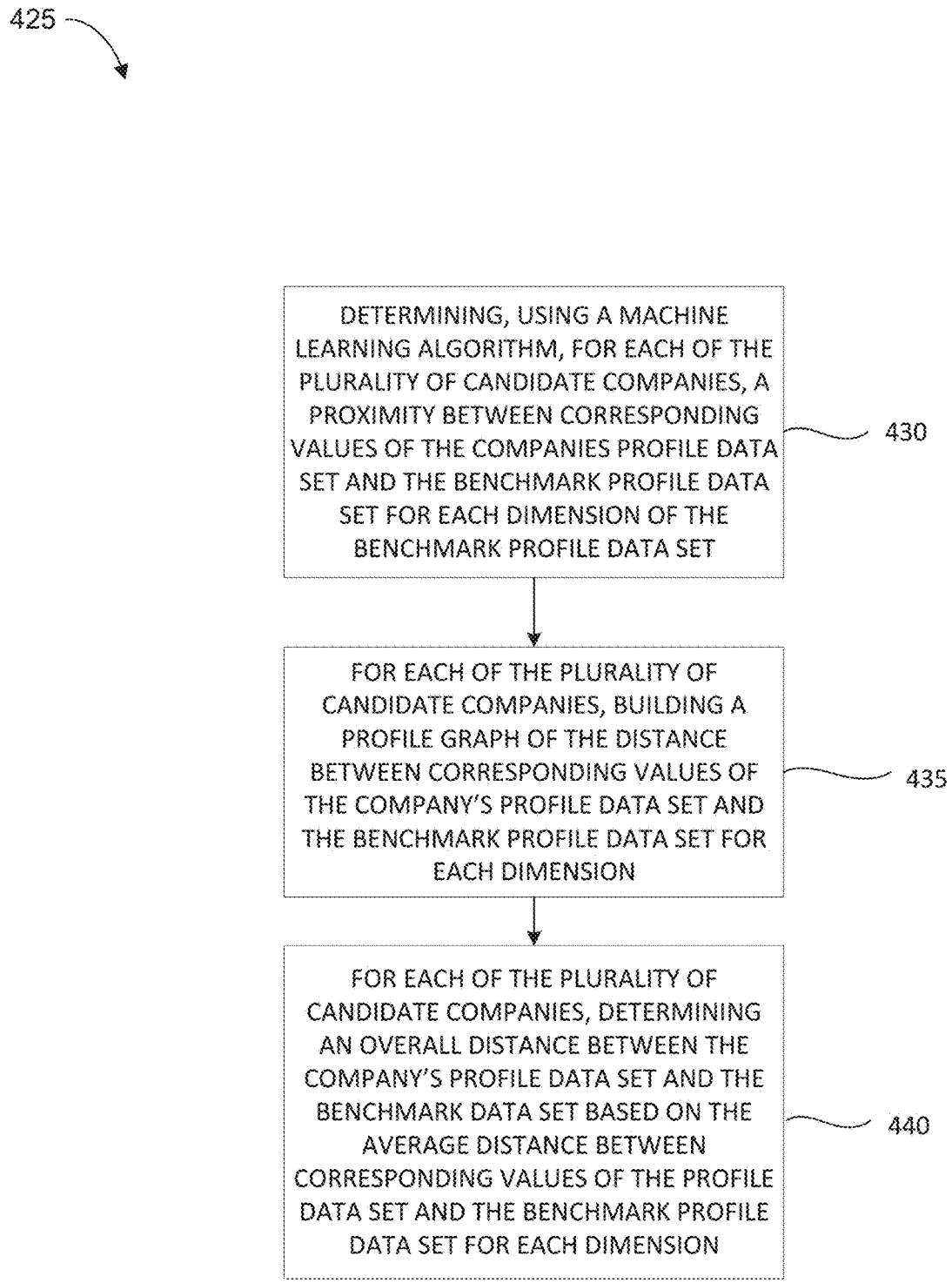
FIG. 4B is a flow diagram illustrating a method for identifying similar profile data sets, in accordance with some embodiments of the present disclosure.

FIG. 4B illustrates a method 425 of determining one or more of a plurality of profile data sets that are most similar to a benchmark profile data set, in accordance with some embodiments of the present disclosure. Method 425 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 425 may be performed by a computing device (e.g., computing device 110 illustrated in FIG. 1).

The method 425 begins at block 430, where computing device 110 may then utilize an appropriate ML algorithm to compare the profile dataset for each of the plurality of candidate companies to the benchmark dataset 120C in order to find candidate companies that are the most closely related to the benchmark company. The machine learning algorithm may be any appropriate ML algorithm such as the K-nearest neighbors algorithm, neighborhood component analysis algorithm, or the large margin nearest neighbors algorithm, for example. More specifically, for each of the plurality of candidate companies, computing device 110 may utilize the ML algorithm to determine a distance between the profile data set for that company and the benchmark profile data set. Computing device 110 may determine this distance for each dimension (e.g., CRM software used, company size, vertical, etc.) of the profile data set and benchmark profile data sets as well as an overall distance computation. The distance may be calculated as the Euclidean distance, cosine similarity, or any other suitable distance measurement between corresponding values of the profile data set for that company and the benchmark profile data set for each dimension as well as overall distance. For example, computing device 110 may determine the Euclidean distance between the employee count, revenue, market segment, and other dimensions of the profile data set for that candidate company and the benchmark profile data set.

At block 435, based on the ML analysis, for each of the plurality of profile data sets, computing device 110 may create a profile graph showing the proximity of that profile data set to the benchmark profile data set in various dimensions. FIGS. 2A-2C illustrate profile graphs 200A-200C respectively. Each of the profile graphs 200 illustrate the proximity of a profile data set 201 to the benchmark profile data set 202 in 4 dimensions A-D. Each dimension may represent a particular aspect of the candidate company and benchmark profile data sets. In the example of FIGS. 2A-2C, dimension A may correspond to employee count, dimension B may correspond to revenue, dimension C may correspond to market segment, and dimension D may correspond to CRM software used. FIGS. 2A-2C illustrate four dimensions of Euclidean distance for ease of illustration, but as discussed herein, the profile graph for each of the plurality of profile data sets may include a Euclidean distance between corresponding values of the profile data set and benchmark profile data set for each dimension of information.

At block 440, upon generating the profile graph for each of the plurality of profile data sets (i.e. candidate companies), computing device 110 (executing module 120) may determine the overall distance between each profile data set 201 and the benchmark profile data set 202 based on the average distance between that profile data set and the benchmark profile data set for each dimension A-D. FIG. 3 illustrates a profile graph 300 showing the overall proximity of each profile data set 201 to the benchmark profile data set 202. As shown in FIG. 3, profile data set 201A may have an overall distance of 3.75 from the benchmark profile data set 202, profile data set 201B may have an overall distance of 6.25 from the benchmark profile data set 202, and profile data set 201C may have an overall distance of 7.75 from the benchmark profile data set 202.

Referring back to FIG. 4A, at block 420, computing device 110 may order each candidate company by the overall distance between its profile data set the benchmark profile data set 202 and may present this information to a user. In some embodiments, computing device 110 may identify the candidate companies corresponding to the one or more profile data sets that have the smallest overall distance to the benchmark profile data set as companies most similar to the benchmark company, and thus candidate companies most likely to represent a similar business opportunity as the benchmark company.

Figure 5:
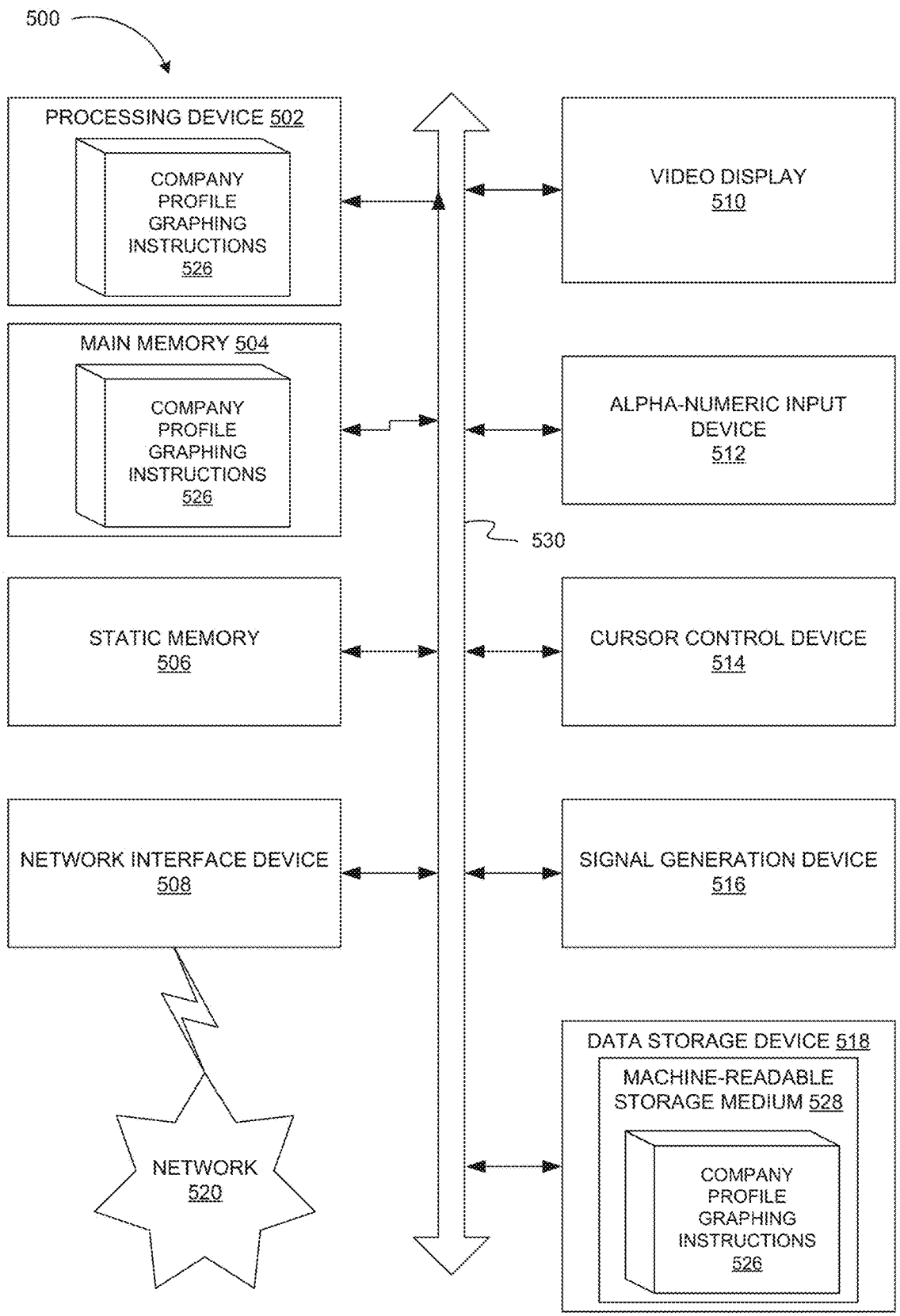
FIG. 5 is a block diagram of a computing device which may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., company profile graphing instructions for carrying out the operations described herein, in accordance with one or more aspects of the present disclosure. Company profile graphing instructions implementing module 526 may also reside, completely or at least partially, within main memory 504 and/or within processing device 502 during execution thereof by computing device 500, main memory 504 and processing device 502 also constituting computer-readable media. The company profile graphing instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method, comprising:
    scanning, periodically with a web crawler, a plurality of web sites to identify instances of a technological signature across the plurality of web sites, wherein the technological signature corresponds to a specific technology;
    determining a set of entities that utilize the specific technology based on the instances of the technological signature across the plurality of web sites;
    in response to a request received from a client device over a network for profiling a benchmark entity, obtaining a benchmark profile data set for the benchmark entity;
    obtaining, by a computing device, a plurality of profile data sets, each of the plurality of profile data sets corresponding to a candidate entity, wherein each of the plurality of profile data sets and the benchmark profile data set comprises a plurality of dimensions with at least one dimension corresponding to each of firmographic, technographic, and public information, and wherein a dimension of the plurality of dimensions corresponds to utilization of the specific technology;
    scanning, periodically, unstructured data from a plurality of sources utilizing natural language processing to infer relationships between a plurality of entities and a particular technology, wherein at least one dimension of the plurality of dimensions in the benchmark profile data set corresponds to a relationship with the particular technology by the candidate entity,
    wherein obtaining the plurality of profile data sets and the benchmark profile data set comprises:
        for each of the profile data sets,
            scraping information for each of the plurality of dimensions,
            converting the information for each of the plurality of dimensions into a numerical value that is usable by a machine learning algorithm, the machine learning algorithm including at least one of a K-nearest neighbors algorithm, a neighborhood component analysis algorithm, or a large margin nearest neighbors algorithm, and
            structuring the numerical values for the plurality of dimensions into a format expected by the machine learning algorithm;
    determining one or more of the plurality of profile data sets that are most similar to the benchmark profile data set with the machine learning algorithm, wherein determining the one or more of the plurality of profile data sets that are most similar comprises:
        for each of the plurality of profile data sets,
            determining a distance representing a difference between corresponding values of the profile data set and the benchmark profile data set for each dimension of the benchmark profile data set, and
            determining an overall distance between the profile data set and the benchmark profile data set based on an average distance between the profile data set and the benchmark profile data set for each dimension of the benchmark profile data set;
    identifying the one or more candidate entities corresponding to the one or more profile data sets as companies most similar to the benchmark entity;
    generating a graphical representation representing the benchmark entity and the identified candidate entities, the graphical representation including one or more graphics attributes representing a degree of a similarity between the benchmark entity and each of the identified candidate entities; and
    transmitting the graphical representation to the client device over the network to be presented therein.

2. The method of claim 1, wherein determining one or more of the plurality of profile data sets that are most similar further comprises identifying as the one or more of the plurality of profile data sets, one or more profile data sets having the least overall distance to the benchmark profile data set.

3. The method of claim 1, wherein determining one or more of the plurality of profile data sets that are most similar further comprises:
    for each of the plurality of profile data sets, building a profile graph of the distance between corresponding values of the profile data set and the benchmark profile data set for each dimension of the benchmark profile data set.

4. The method of claim 1, wherein the distance is calculated based on prior interactions between two entities.

5. The method of claim 1, wherein the graphical representation includes a plurality of nodes coupled to each other, each representing one of the benchmark entity and one of the identified candidate entities.

6. The method of claim 5, wherein a connection between a node representing the benchmark entity and a node representing each of the candidate entities is rendered with a set of one or more graphics attributes representing a degree of similarity between the benchmark entity and the candidate entity.

7. The method of claim 6, wherein a graphics attribute of the set of graphics attributes comprises one or more of a color of the connection, a length of the connection, and a shape of the connection.

8. The method of claim 1, comprising utilizing natural language processing to identify the technographic information based on analysis of text from one or more of a job posting, social media, and a press release.

9. The computer-implemented method of claim 1, further comprising determining when the specific technology appears or disappears for each entity in the set of entities determined to utilize the specific technology, wherein at least one of the plurality of dimensions in the plurality of profile data sets and the benchmark profile data set corresponds to appearance or disappearance of the specific technology.

10. The computer-implemented method of claim 1, wherein the specific technology comprises one or more of a hardware, a software, network virtualization platform, firewall software, and video conferencing software.

11. The method of claim 1, The one or more graphics attributes for each of the identified candidate entities includes the distance representing the difference between corresponding values of the profile data set and the benchmark profile data set for each dimension of the benchmark profile data set.

12. A non-transitory machine-readable medium having instructions stored therein, which when executed by a processor, cause the processor to perform operations, the operations comprising:
  scanning, periodically with a web crawler, a plurality of web sites to identify instances of a technological signature across the plurality of web sites, wherein the technological signature corresponds to a specific technology;
  determining a set of entities that utilize the specific technology based on the instances of the technological signature across the plurality of web sites;
  in response to a request received from a client device over a network for profiling a benchmark entity, obtaining a benchmark profile data set for the benchmark entity;
  obtaining a plurality of profile data sets, each of the plurality of profile data sets corresponding to a candidate entity, wherein each of the plurality of profile data sets and the benchmark profile data set comprises a plurality of dimensions with at least one dimension corresponding to each of firmographic, technographic, and public information, and wherein a dimension of the plurality of dimensions corresponds to utilization of the specific technology;
  scanning, periodically, unstructured data from a plurality of sources utilizing natural language processing to infer relationships between a plurality of entities and a particular technology, wherein at least one dimension of the plurality of dimensions in the benchmark profile data set corresponds to a relationship with the particular technology by the candidate entity,
  wherein obtaining the plurality of profile data sets and the benchmark profile data set comprises:
    for each of the profile data sets,
      scraping information for each of the plurality of dimensions,
      converting the information for each of the plurality of dimensions into a numerical value that is usable by a machine learning algorithm, the machine learning algorithm including at least one of a K-nearest neighbors algorithm, a neighborhood component analysis algorithm, or a large margin nearest neighbors algorithm, and
      structuring the numerical values for the plurality of dimensions into a format expected by the machine learning algorithm;
  determining one or more of the plurality of profile data sets that are most similar to the benchmark profile data set with the machine learning algorithm, wherein determining the one or more of the plurality of profile data sets that are most similar comprises:
    for each of the plurality of profile data sets,
      determining a distance representing a difference between corresponding values of the profile data set and the benchmark profile data set for each dimension of the benchmark profile data set, and
      determining an overall distance between the profile data set and the benchmark profile data set based on an average distance between the profile data set and the benchmark profile data set for each dimension of the benchmark profile data set;
  identifying the one or more candidate entities corresponding to the one or more profile data sets as companies most similar to the benchmark entity;
  generating a graphical representation representing the benchmark entity and the identified candidate entities, the graphical representation including one or more graphics attributes representing a degree of a similarity between the benchmark entity and each of the identified candidate entities; and
  transmitting the graphical representation to the client device over the network to be presented therein.

13. The machine-readable medium of claim 12, wherein determining one or more of the plurality of profile data sets that are most similar further comprises identifying as the one or more of the plurality of profile data sets, one or more profile data sets having the least overall distance to the benchmark profile data set.

14. The machine-readable medium of claim 12, wherein determining one or more of the plurality of profile data sets that are most similar further comprises:
  for each of the plurality of profile data sets, building a profile graph of the distance between corresponding values of the profile data set and the benchmark profile data set for each dimension of the benchmark profile data set.

15. The machine-readable medium of claim 12, wherein the distance is calculated based on prior interactions between two entities.

16. The machine-readable medium of claim 12, wherein the graphical representation includes a plurality of nodes coupled to each other, each representing one of the benchmark entity and one of the identified candidate entities.

17. The machine-readable medium of claim 16, wherein a connection between a node representing the benchmark entity and a node representing each of the candidate entities is rendered with a set of one or more graphics attributes representing a degree of similarity between the benchmark entity and the candidate entity, wherein the set of one or more graphics attributes includes one or more of a color of the connection, a length of the connection, and a shape of the connection.

18. The machine-readable medium of claim 12, having further instructions stored therein, which when executed by the processor, cause the processor to perform operations comprising utilizing natural language processing to identify the technographic information based on analysis of text from one or more of a job posting, social media, and a press release.

19. The machine-readable medium of claim 12, having further instructions stored therein, which when executed by the processor, cause the processor to perform operations comprising determining when the specific technology appears or disappears for each entity in the set of entities determined to utilize the specific technology, wherein at least one of the plurality of dimensions in the plurality of profile data sets and the benchmark profile data set corresponds to appearance or disappearance of the specific technology.

20. A data processing system, comprising:
a processor; and
a memory coupled to the processor to store instructions, which when executed by the processor, cause the processor to perform operations, the operations including:
scanning, periodically with a web crawler, a plurality of web sites to identify instances of a technological signature across the plurality of web sites, wherein the technological signature corresponds to a specific technology,
determining a set of entities that utilize the specific technology based on the instances of the technological signature across the plurality of web sites,
in response to a request received from a client device over a network for profiling a benchmark entity, obtaining a benchmark profile data set for the benchmark entity,
obtaining a plurality of profile data sets, each of the plurality of profile data sets corresponding to a candidate entity, wherein each of the plurality of profile data sets and the benchmark profile data set comprises a plurality of dimensions with at least one dimension corresponding to each of firmographic, technographic, and public information, and wherein a dimension of the plurality of dimensions corresponds to utilization of the specific technology;
scanning, periodically, unstructured data from a plurality of sources utilizing natural language processing to infer relationships between a plurality of entities and a particular technology, wherein at least one dimension of the plurality of dimensions in the benchmark profile data set corresponds to a relationship with the particular technology by the candidate entity,
wherein obtaining the plurality of profile data sets and the benchmark profile data set comprises:
for each of the profile data sets,
scraping information for each of the plurality of dimensions,
converting the information for each of the plurality of dimensions into a numerical value that is usable by a machine learning algorithm, the machine learning algorithm including at least one of a K-nearest neighbors algorithm, a neighborhood component analysis algorithm, or a large margin nearest neighbors algorithm, and
structuring the numerical values for plurality of dimensions into a format expected by the machine learning algorithm,
determining one or more of the plurality of profile data sets that are most similar to the benchmark profile data set with the machine learning algorithm, wherein determining the one or more of the plurality of profile data sets that are most similar comprises:
for each of the plurality of profile data sets,
determining a distance representing a difference between corresponding values of the profile data set and the benchmark profile data set for each dimension of the benchmark profile data set, and
determining an overall distance between the profile data set and the benchmark profile data set based on an average distance between the profile data set and the benchmark profile data set for each dimension of the benchmark profile data set,
identifying the one or more candidate entities corresponding to the one or more profile data sets as companies most similar to the benchmark entity,
generating a graphical representation representing the benchmark entity and the identified candidate entities, the graphical representation including one or more graphics attributes representing a degree of a similarity between the benchmark entity and each of the identified candidate entities; and
transmitting the graphical representation to the client device over the network to be presented therein.

* * * * *